United States Patent [19]

Bush

[11] Patent Number: 4,680,915

[45] Date of Patent: Jul. 21, 1987

[54] TAPERED SURFACE PANEL RETAINER

[75] Inventor: Earl D. Bush, Downers Grove, Ill.

[73] Assignee: Handy Button Machine Company, Melrose Park, Ill.

[21] Appl. No.: 879,925

[22] Filed: Jun. 30, 1986

[51] Int. Cl.[4] ............................................. E06B 3/62
[52] U.S. Cl. .................................... 52/766; 49/465; 52/202; 248/504
[58] Field of Search ............... 52/766, 202, 203, 213, 52/455; 49/465; 248/504, 507; 16/1 R; 40/156; 269/165; 292/67, 343, DIG. 38

[56] References Cited

U.S. PATENT DOCUMENTS

| | | | |
|---|---|---|---|
| 2,733,492 | 2/1956 | Copell | 248/507 X |
| 3,146,502 | 9/1964 | Reiss et al. | 52/766 |
| 3,387,814 | 6/1968 | Fischer | 248/507 |
| 3,704,563 | 12/1972 | Waller | 52/455 |
| 4,106,236 | 8/1978 | Oliphant | 49/465 X |
| 4,525,961 | 7/1985 | Hansen | 52/213 X |

Primary Examiner—J. Karl Bell
Attorney, Agent, or Firm—Trexler, Bushnell, Giangiorgi & Blackstone, Ltd.

[57] ABSTRACT

A panel retainer comprises a one-piece, integrally formed member, formed from a resilient, elastically bendable material, and having a fastener-receiving portion and a panel-gripping portion. The fastener-receiving portion comprises a body portion having a top surface and a substantially flat bottom surface spaced from the top surface and defining a through aperture for receiving a fastener to secure the retainer to a given surface. The panel-gripping portion comprises a further body portion projecting from the first body portion and having a tapered surface portion diverging from the first body bottom flat surface for engagement with a panel to be retained thereby. The gripping portion is flexible in the area where it joins with the fastener-receiving portion to permit resilient, elastic bending thereof for engagement of the tapered surface in a surface-to-surface engagement with the panel.

5 Claims, 9 Drawing Figures

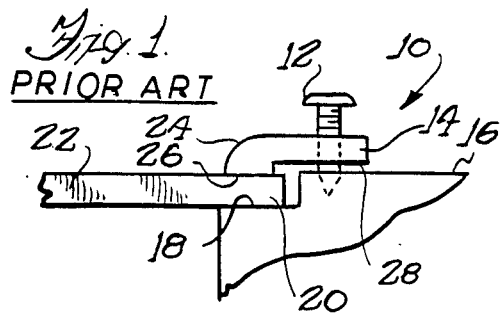
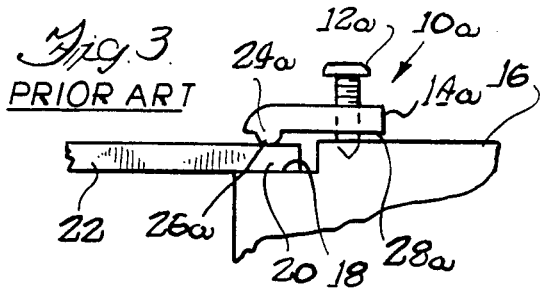
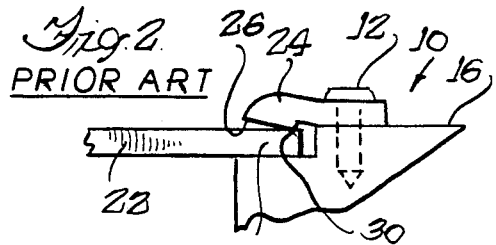
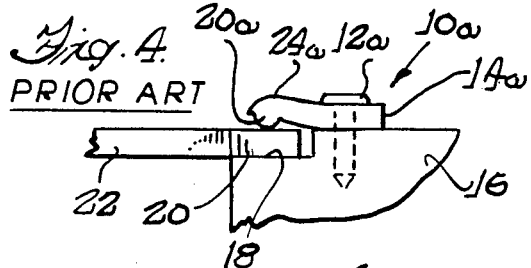
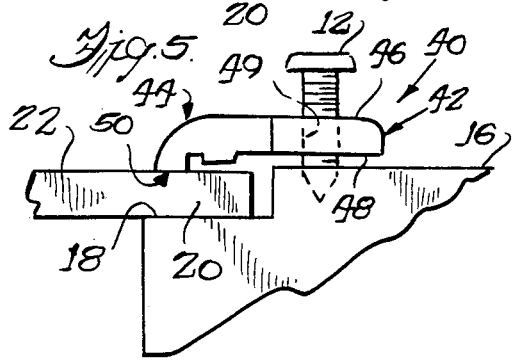
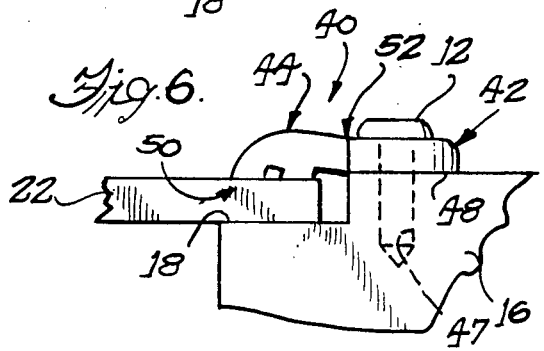
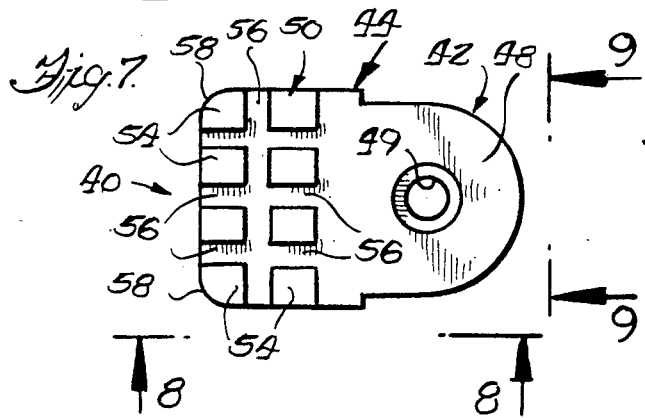
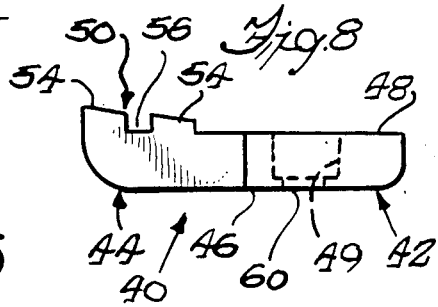
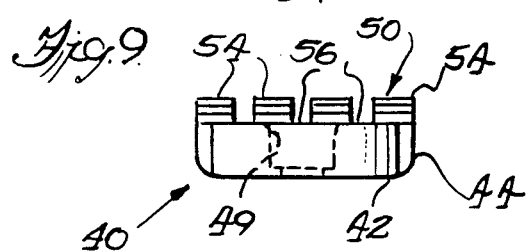

TAPERED SURFACE PANEL RETAINER

BACKGROUND OF THE INVENTION

The present invention is directed to the panel retainer arts, and more particularly to a novel and improved panel retainer having a tapered surface.

Panel retainer members or clips are designed for use in curio cabinets or similar pieces of furniture for retaining shelves or similar panels in place. Often, in such items of furniture, shelves or panels of glass or other materials are set flush into a frame or into surrounding support grooves or shoulders or the like provided therefor. However, such shelves or panels, particularly when formed of glass, should be removable for cleaning or replacement if necessary. Moreover, some shelves or panels may be selectively removable or selectively positionable within the cabinet to form a desired shelf configuration.

The prior art has devised a number of panel retainer members for generally gripping edge parts of the panels or shelves where they rest on grooves or other support members provided therefor. Generally speaking, such retainers include a fastener-receiving portion having a through aperture for accommodating a threaded fastener or screw therethrough. Usually, a wood screw or similar screw is utilized to pass through the aperture and engage a complementary aperture provided therefore in a surface immediately adjacent the panel- or shelf-edge-receiving surface of the furniture. Accordingly, a second, panel-gripping portion of the panel retainer extends outwardly of this fastener-receiving body portion to overlie and engage a top surface of the panel or shelf. Hence, as the fastener is advanced and tightened relative to the adjacent frame, the panel-retaining portion advances relative to the shoulder or other support member underlying the panel or shelf edge to grip the same securely therebetween.

However, many of the prior art panel-engaging arrangements provide only a relatively small surface area in contact with the panel edge. This results in a reduction of the holding power or force gripping engagement with the panel, such that the panel may well slip or move during shipment, or even while in service, due to vibrations or the like. Such movement or shifting can of course result in damage or breakage of the panel, particularly when glass shelves or panels are used. Moreover, when only a relatively small surface area of the retainer is in contact with the panel, the load on the panel due to tightening of the retainer fastener will be imposed on a relatively small area of surface contact. Such excessive per unit area forces can also cause damage or breakage of the panel, and particularly a glass shelf or panel, at or around the points or areas of contact with the retainer.

Accordingly, we have determined that it is most advantageous to maximize the holding power of the retainer while minimizing the per unit area load imposed thereby upon the panel.

OBJECTS AND SUMMARY OF THE INVENTION

Accordingly, it is a general object of the invention to provide a novel and improved panel retainer.

A more specific object is to provide a panel retainer which provides relatively increased holding power, but decreased per unit area load as compared to prior art panel retainers.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a side elevation of a prior art panel retainer in engagement with a panel, prior to tightening of a fastener relative thereto;

FIG. 2 side elevation of the prior art panel retainer of FIG. 1, showing the fastener fully advanced or tightened;

FIGS. 3 and 4 are side elevations similar to FIGS. 1 and 2 illustrating a second form of prior art panel retainer, both prior to and following full advancement and tightening of a fastener relative thereto;

FIG. 5 is an enlarged side elevation showing a panel retainer in accordance with the present invention in place for engagement with a panel, prior to a fastener being advanced and tightened relative thereto;

FIG. 6 is a side elevation similar to FIG. 5, illustrating a fastener fully advanced or tightened relative to the panel retainer of the invention;

FIG. 7 is an enlarged bottom plan view of the panel retainer of the invention;

FIG. 8 is a side elevation taken generally along the line 8—8 of FIG. 7; and

FIG. 9 is an end elevation taken generally along the line 9—9 of FIG. 7.

DETAILED DESCRIPTION OF THE ILLUSTRATED EMBODIMENT

Referring now to the drawings, and initially to FIGS. 1 through 4, it will be instructive to initially review two forms of prior art panel retainers, so that the novel features of the present invention may be more fully appreciated.

One form of prior art panel retainer 10 is illustrated in FIGS. 1 and 2. In FIG. 1, the retainer 10 is illustrated prior to full advancement and tightening of an associated threaded fastener or screw 12, while in FIG. 2, the screw 12 is shown fully advanced and tightened. The panel retainer 10 includes a fastener-receiving portion 14 which generally overlies, and upon advancement of screw 12, engages a surface 16 of the furniture or cabinet. This surface 16 is immediately adjacent to, and normally peripheral to, a shoulder or groove 18 for receiving and supporting an edge 20 of a panel or shelf 22. The panel or shelf 22 may be of glass or other material, however, as will be seen presently, the present invention is most advantageous in connection with securing panels or shelves of glass. The panel retainer 10 is provided with a panel-engaging portion 24 which extends outwardly from the fastener-receiving portion 14 thereof. In accordance with the prior art configuration of FIGS. 1 and 2, this panel-retaining portion has a flat, panel-engaging surface 26 which generally is stepped or extends somewhat below and in a plane parallel to a flat undersurface 28 of the fastener-receiving portion 14.

Accordingly, upon full advancement of fastener 12, the panel retainer 10 assumes the position shown in FIG. 2. It will be noted that the relatively flat undersurface 26 of panel-retaining portion 24 tends to tilt somewhat about its trailing edge surface 30. That is, since the surface 26 is flat and initially horizontal and parallel to and below bottom surface 28, the leading or outer edge thereof tends to lift off and away from the panel, generally tilting or fulcruming about the rear edge portion 30. This results in a marked reduction in the surface area of the retainer in contact with the panel. Such reduction of contact area reduces the holding power or grip on the panel, which can permit undesired shifting or movement of the panel and resultant possible damage thereto or breakage thereof. This reduced area of surface contact also increases the per unit area load or force on the edge 20 of the panel, which may cause some breakage or damage of the panel edge 20 at or near the area of contact with the retainer.

Referring now to FIGS. 3 and 4, a second form of prior art retainer attempted to alleviate some of the foregoing problems by providing a panel-retaining portion 24a having an undersurface or panel-engaging surface 26a which was generally curvilinear or rounded. In some prior art retainers, surface 26a actually comprised a generally semi-spherical protrusion. In this regard, the parts and components of the prior art arrangement of FIGS. 3 and 4 are designated by like reference numerals to the similar parts of FIGS. 1 and 2, with the suffix a. However, upon advancement of fastener 12a, as shown in FIG. 4, the panel-retaining member 24a still provides only a relatively small surface area in contact with the panel 22. That is, only a relatively small portion of the surface area of rounded or spherical portion 26a actually contacts the surface of the panel 22. Accordingly, this relatively small surface contact area results in the same problems discussed above relative to the prior art arrangement of FIGS. 1 and 2. Namely, the reduced surface area of contact both reduces the holding power of the retainer and increases the per unit area load on the panel edge.

Referring now to FIGS. 5 through 9, a panel retainer 40 in accordance with the invention alleviates the foregoing problems of the prior art devices of FIGS. 1 through 4. In this regard, the panel retainer 40 of the invention comprises a one-piece integrally formed member, formed from a resilient, elastically bendable or deformable material. The panel retainer 40 includes a fastener-receiving portion 42 and a panel-gripping portion 44.

Generally speaking, the fastener-receiving portion 42 need not be of any particular configuration in accordance with the invention. Rather, portion 42 need only define a body for receiving fastener 12 therethrough to secure the same to a surface 16 of the furniture or cabinet adjacent the panel-receiving groove or peripheral shoulder surface 18. In the illustrated embodiment, this fastener receiving portion or body 42 has spaced apart top and bottom surfaces 46, 48, the latter being substantially flat, for flat, surface-to-surface contact with furniture surface 18 upon advancement of fastener 12. Preferably, the fastener-receiving portion or body 42 additionally defines a preformed through aperture 49 for receiving the fastener 12 therethrough. In this regard, fastener 12 is preferably a threaded, screw type fastener, which may have a wood screw type of thread or other suitable thread form for engagement and advancement relative to furniture surface 16, which may be additionally provided with a pre-bored opening 47 to receive the fastener, if desired.

The panel-retaining portion 44 preferably comprises a further projecting body portion, which extends or projects from the fastener-receiving body 42. Hence, panel-retaining portion 44 extends outwardly from both the body 42 and the surface 16 to overlie panel-receiving surface 18, and to grip the panel edge 20 therebetween when the fastener 12 is advanced. In accordance with the invention, the panel-retaining portion has a tapered gripping surface, designated generally by reference numeral 50, for engagement with the panel 22. The panel retaining portion 44 is also flexible or bendable relative to the fastener-receiving portion or body 42, particularly in the area intermediate the two portions, or where the two are joined, as designated generally by reference numeral 52 in FIG. 6.

Consequently, when the fastener 12 is fully advanced as illustrated in FIG. 6, the panel-retaining portion flexes or bends backwardly or upwardly within its elastic band within its elastic limits somewhat in consequence of the engagement of the tapered surface 50 with the panel 22. In accordance with the invention, the tapered surface 50 tapers in a divergent fashion relative to the flat undersurface 48 of the fastener-receiving body 42. Advantageously, as best seen in FIG. 6, this tapered divergent surface 50, together with the flexible or elastic nature of the panel retainer 40, assures a relatively large area of surface-to-surface contact between surface 50 and the panel 22.

Referring now also to FIGS. 7 through 9, in accordance with the preferred form of the invention illustrated, the gripping surface 50 comprises a plurality of individual, discrete protruding lugs 54. Each of these protruding lugs 54 has a flat, tapered surface and the lugs are arranged such that their flat tapered surfaces collectively define the tapered gripping surface 50. Moreover, the lugs 54 define grooves or recesses 56 therebetween. In consequence of these grooved or recessed portions, and the flexible nature of the panel retainer 40, the lugs 54 and hence the gripping surface 50 is sufficiently elastically deformable to permit flat, surface-to-surface engagement between the individual lugs 54 and the panel 22. Advantageously, this helps assure a maximum surface area of engagement therebetween, accommodating any slight irregularities in the surface of the panel 22, or misalignments of the shelf 22 or of the retainer 40 relative to the surfaces 16, 18 of the furniture, due to irregularities in any of these surfaces or in the retainer itself, or the like.

In accordance with the illustrated embodiment, the lugs 54 are distributed in an orthogonal, grid-like pattern, such that the grooves or recesses 56 also define an orthogonal grid-like pattern. Moreover, the lugs 54 of the illustrated embodiment are substantially rectilinear, and preferably substantially square in cross-section. Preferably, however, the leading lateral edges 58 of the retainer are rounded, such that outermost lugs 54 are also similarly rounded at their lateral edges and hence not completely square in cross-section.

In the illustrated embodiment, the fastener-receiving body or portion 42 additionally defines a thin, radially inwardly extending lip portion 60 about through aperture 49 at the top surface 46 thereof. This lip 60 is substantially coaxial with the through aperture 49. It will also be noted that in the illustrated embodiment the grooves or recesses 56 defined between the lugs 54 are substantially coplanar with the flat undersurface 48 of the fastener-receiving portion 42.

Advantageously, the foregoing configuration of the gripping lugs 54, and the flexibility of the material of the retainer 40 provide a spring-like or resilient gripping engagement with the panel 22. Such engagement is advantageous both for relieving any possible excessive force due to overadvancement of fastener 12, misalignment of the shoulder or shelf-receiving member 18 relative to surface 16, or the like. However, this configuration also assures relatively firm, gripping engagement of a maximum surface area of lugs 54 with the panel 22 to assure engagement over a relatively large total surface area. As discussed hereinabove, such flexibility and engagement over relatively large surface area increases the holding power or grip on the panel, while advantageously decreasing the per unit area loading forces thereupon.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A panel retainer comprising: a one-piece integrally formed member, formed from a resilient, elastically bendable material, and having a fastener-receiving portion and a panel-gripping portion; said fastener-receiving portion comprising a body portion having a top surface and a substantially flat bottom surface spaced from said top surface, said body defining a through aperture for receiving a fastener to secure the retainer to a given surface; and said panel-gripping portion comprising a further body portion projecting from said first body portion and having means defining thereupon a substantially flat tapered, panel-engaging surface portion diverging from said first body portion bottom flat surface in the direction of a panel to be retained thereby for engagement therewith; said gripping portion being flexible in the area where it joins with said fastener-receiving portion to permit resilient, elastic bending thereof for engagement of said flat tapered surface in a substantially flat surface-to-surface engagement with said panel.

2. A panel retainer according to claim 1 wherein said means defining said tapered surface comprises a plurality of individual, discrete protruding lugs, each said lug having a flat, tapered surface so as to collectively define said tapered surface of the panel-gripping portion, said lugs also defining grooves therebetween; and said panel-gripping portion being sufficiently elastically deformable to permit individual flat, surface-to-surface engagement of each of said lug flat tapered surfaces with said panel thereby to accommodate slight irregularities in the surface of said panel, in said retainer, or in the mounting of either thereof relative to said given surface.

3. A panel retainer according to claim 2 wherein said lugs are distributed in a generally orthogonal, grid-like patterns, thereby defining a grid-like pattern of orthogonal grooves therebetween.

4. A panel retainer according to claim 3 wherein each of said lugs is substantially rectangular in cross-section.

5. A panel retainer according to claim 1 wherein said fastener-receiving portion body portion also defines an inwardly extending lip portion of somewhat lesser diameter than said through aperture substantially concentric with said through aperture and extending into said through aperture a short distance from said top surface of said body.

* * * * *